(12) United States Patent
Okuda et al.

(10) Patent No.: US 7,823,970 B2
(45) Date of Patent: Nov. 2, 2010

(54) VEHICLE SEATS

(75) Inventors: Shinji Okuda, Toyota (JP); Osamu Fujimoto, Nissin (JP); Masatoshi Handa, Mishima (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 139 days.

(21) Appl. No.: 12/196,475

(22) Filed: Aug. 22, 2008

(65) Prior Publication Data

US 2009/0058159 A1 Mar. 5, 2009

(30) Foreign Application Priority Data

Aug. 28, 2007 (JP) .............................. 2007-221015

(51) Int. Cl.
*B60N 2/42* (2006.01)
(52) U.S. Cl. .............................. 297/216.1; 297/216.13; 297/216.15; 297/216.19; 296/68.1
(58) Field of Classification Search .............. 297/216.1, 297/216.13, 216.15, 216.19; 296/68.1, 65.01
See application file for complete search history.

(56) References Cited

U.S. PATENT DOCUMENTS

| | | | | |
|---|---|---|---|---|
| 5,318,341 A | * | 6/1994 | Griswold et al. | ........ 297/362.11 |
| 6,050,629 A | * | 4/2000 | Bernhardt et al. | ........ 296/65.01 |
| 6,224,132 B1 | * | 5/2001 | Neale | .......................... 296/68.1 |
| 6,767,055 B1 | * | 7/2004 | Sparks | .................. 297/216.14 |
| 7,237,839 B2 | * | 7/2007 | Aufrere et al. | ......... 297/216.13 |

FOREIGN PATENT DOCUMENTS

| | | |
|---|---|---|
| JP | 5420425 | 2/1979 |
| JP | 54-71326 | 5/1979 |
| JP | 2007-176222 | 7/2007 |

OTHER PUBLICATIONS

English language Abstract of JP 2007-176222, Jul. 12, 2007.

* cited by examiner

*Primary Examiner*—Laurie K Cranmer
(74) *Attorney, Agent, or Firm*—Greenblum & Bernstein, P.L.C.

(57) ABSTRACT

A vehicle seat has a seat cushion, a seat bag, a lock mechanism and a belt anchor. The seat cushion has a cushion frame. The seat bag has a back frame that is rotatably connected to the cushion frame. The lock mechanism is provided on each of the frames, and latch-connected to a striker at a vehicle side. The belt anchor is provided on one of the two frames, and is fastened with a seat belt. A force transmission structure is provided between the two frames, in which when the seat belt is pulled forward, so that a member between the belt anchor and the striker is deformed, a member at a side of the one frame pushes a member at a side of the other frame, thereby force is transmitted from the one frame side to the other frame side.

4 Claims, 5 Drawing Sheets

VEHICLE SEATS

This application claims priority to Japanese patent application serial number 2007-221015, the contents of which are incorporated herein by reference.

BACKGROUND OF THE INVENTION

1. Field of the Invention

The present invention relates to a vehicle seat. In particular, the invention relates to a vehicle seat that is foldable, and mounted in a vehicle in a storable or removable manner.

2. Description of the Related Art

A known vehicle seat has, for example, included a structure such that it is capable of being stored in a bottom part of a ceiling of a vehicle (refer to U.S. Pat. No. 6,224,132). The vehicle seat has a seat cushion and seat back connected to each other in a foldable manner. In addition, an arm is provided on an upper part of either lateral side of the seat back, and a tip portion of the arm is rotatably attached to the ceiling of the vehicle. Therefore, the vehicle seat is stored in a bottom of the ceiling in a folded condition where the seat cushion is folded to a seat back side.

The seat cushion and the seat back have rectangular frames respectively, and each frame is latch-connected to a striker at a vehicle side in a use position. Either of the frames has a belt anchor fastened with a seat belt. However, since the frames are connected in a freely rotatable manner, when the seat belt is strongly pulled forward at the time of vehicle crush or the like, force tends to be applied only to a side of the frame where the belt anchor is provided. Therefore, strength of the frame at the side where the belt anchor is provided has to be increased, which complicates the structure of the frame, and increases the weight of the frame.

Thus, there is need in the art for a vehicle seat, which has a structure for dispersedly receiving force by the seat cushion and the seat back, the force being applied when the seat belt is pulled forward.

SUMMARY OF THE INVENTION

One aspect of the present invention can include a vehicle seat having a seat cushion, a seat bag, a lock mechanism and a belt anchor. The seat cushion has a cushion frame. The seat bag has a back frame that is connected to the cushion frame in a freely rotatable manner. The lock mechanism is provided on each of the frames, and latch-connected to a striker at a vehicle side. The belt anchor is provided on one of the two frames, and fastened with a seat belt. A force transmission structure is provided between the two frames, in which when the seat belt is pulled forward, so that a member between the belt anchor and the striker is deformed, a member at a side of the one frame pushes a member at a side of the other frame, thereby force is transmitted from the one frame side to the other frame side.

Therefore, the force transmission structure is provided between the cushion frame and the back frame. And, the force (from the seat belt being pulled), is transmitted from the one frame side to the other frame side by the force transmission structure. Therefore, the force is dispersedly supported by a region at a seat cushion side and a region at a seat back side. Consequently, strength required for the back frame is reduced, and thereby a frame structure can be simplified or reduced in weight.

DETAILED DESCRIPTION OF THE INVENTION

Each of the additional features and teachings disclosed above and below may be utilized separately or in conjunction with other features and teachings to provide improved vehicle seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
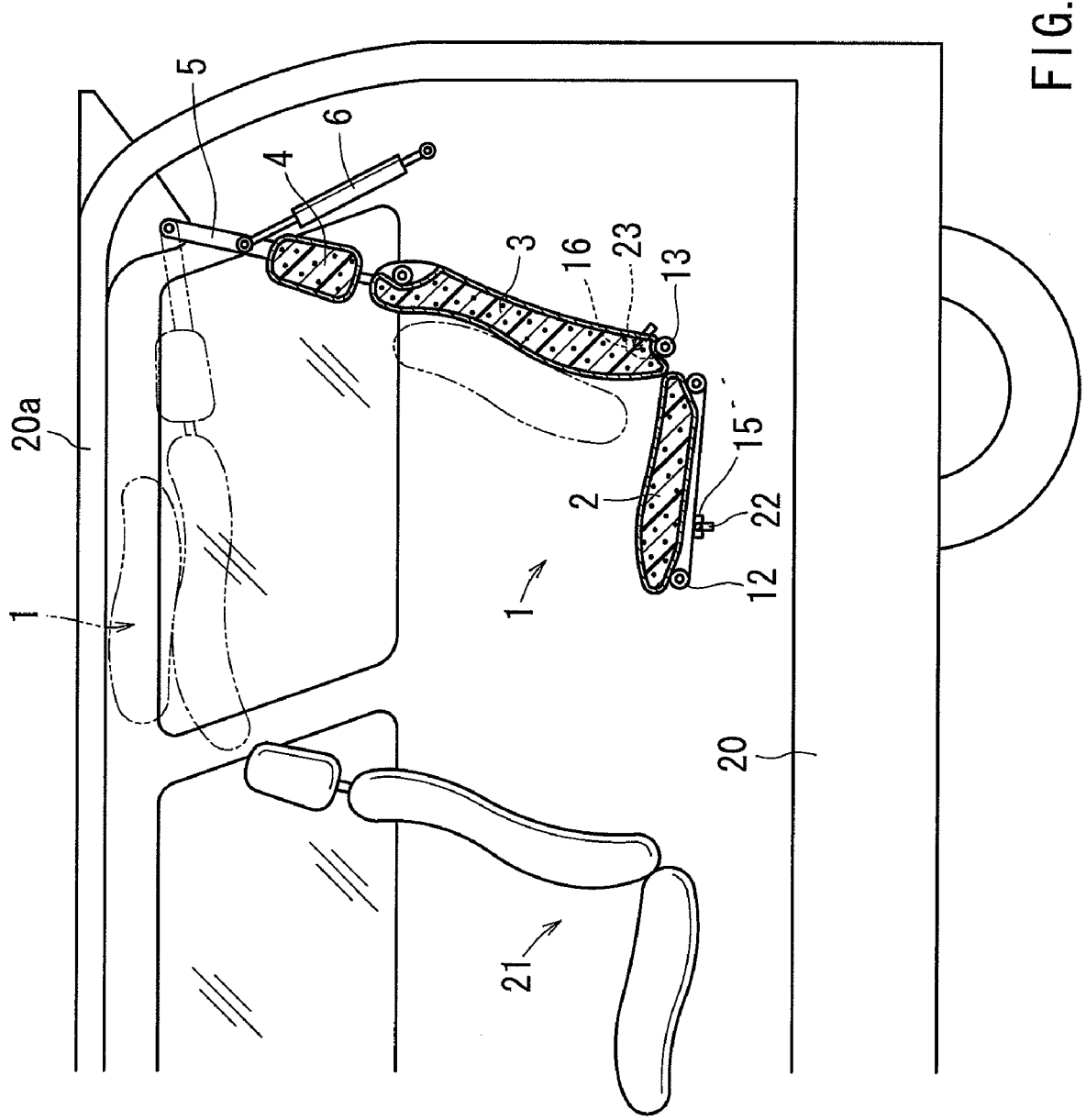
FIG. 1 is a cross-sectional side view of a part of a vehicle.

As shown in FIG. 1, seats can be mounted in three rows in a vehicle. A seat 21 in a first or second row is mounted in a movable manner in a back and forth direction of the vehicle by using a rail provided on a floor surface of the vehicle 20. A seat 1 in a third row is mounted on a ceiling 20a of the vehicle 20 in a rotatable manner by an arm 5, and storable in a bottom side of the ceiling 20a.

The seat 1 is a bench seat as shown in FIG. 1, and has a seat cushion 2 and a seat back 3. Each of the seat cushion 2 and the seat back 3 has a lateral length being approximately the same as width of a vehicle body 20. The seat cushion 2 is connected at a rear end side to the seat back 3 in a freely rotatable manner, and latch-connected (at either front side) to the floor surface of the vehicle body 20 by a lock mechanism 15 in a use position. The seat back 3 is latch-connected at a lower end side to a side surface of the vehicle body 20 by a lock mechanism 16 in a use position. When the lock mechanism 15 is released, the seat cushion 2 is raised to a seat back 3 side by a spring (not shown), so that the seat 1 is folded. Then, when the lock mechanism 16 is released, the seat 1 is raised to a storage position while being assisted by a dumper 6 for biasing the arm 5, and latch-connected to a bottom of the ceiling 20a by a lock mechanism (not shown).

Figure 2:
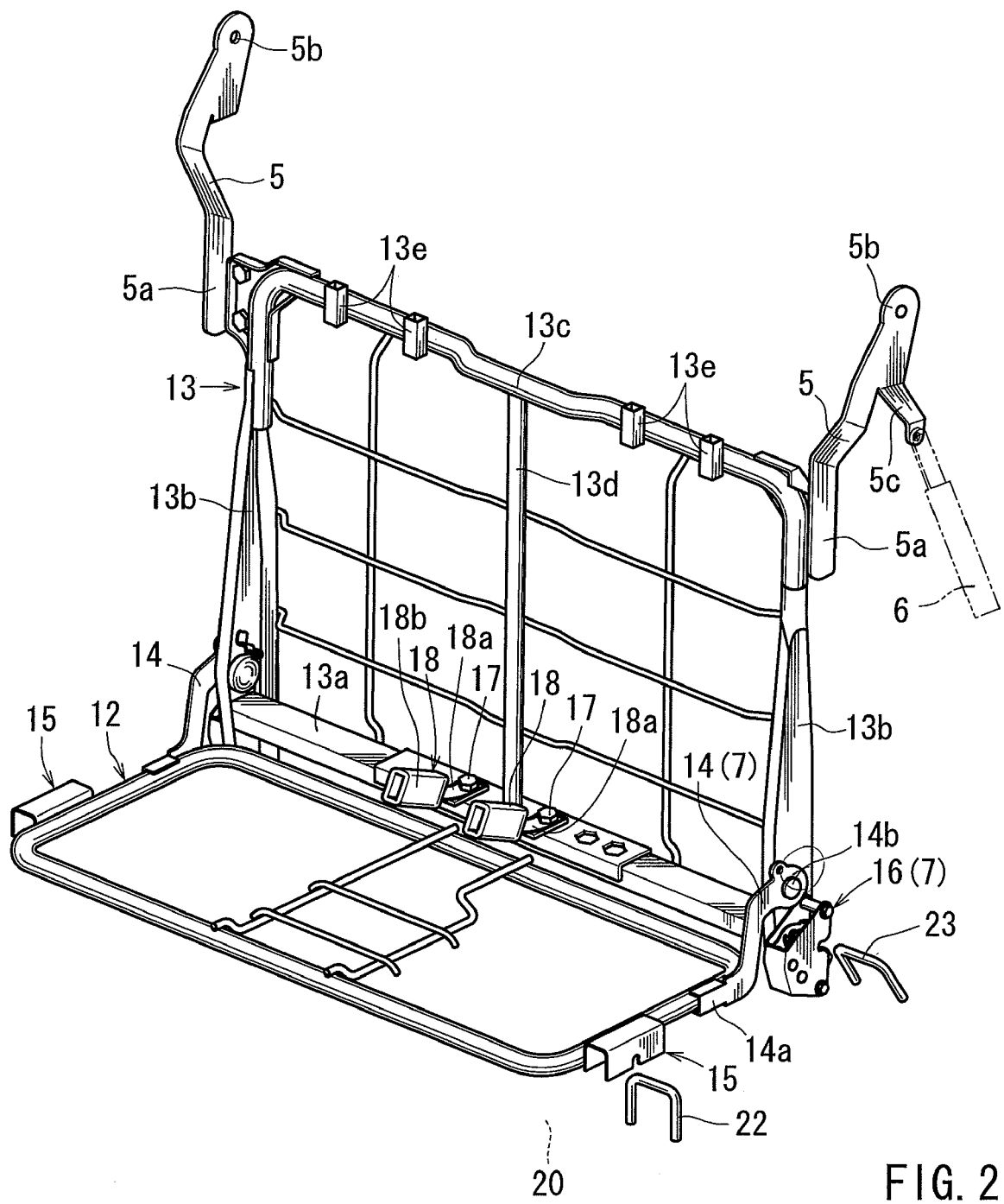
FIG. 2 is a perspective view of a frame structure of a vehicle seat.
Figure 3:
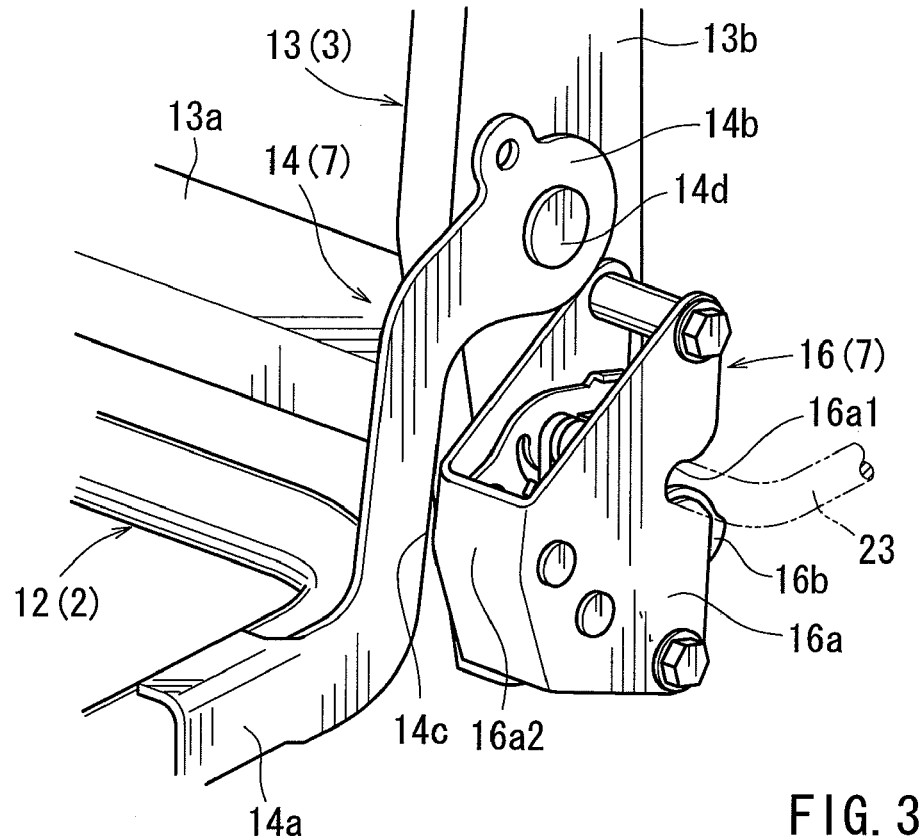
FIG. 3 is a perspective view of a part of the frame structure adjacent to a force transmission structure.
Figure 4:
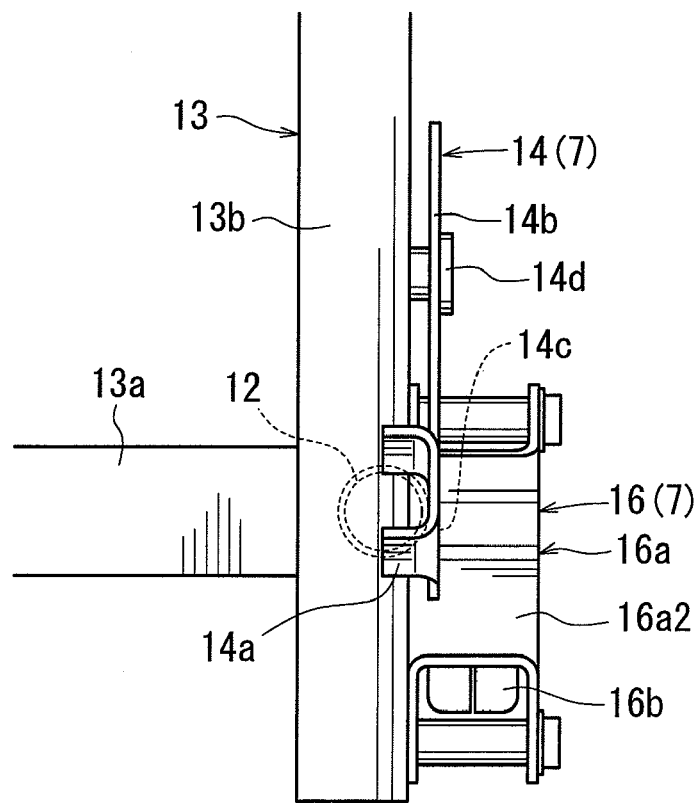
FIG. 4 is a front view of a part of the frame structure adjacent to a force transmission structure.

The seat cushion 2 and the seat back 3 have a cushion frame 12 and a back frame 13 respectively as shown in FIG. 1. The cushion frame 12 and the back frame 13 are formed in a rectangular shape respectively as shown in FIG. 2, and a pair of links 14 for connecting the frames to each other are provided between the frames. Each link 14 is fixed at one end 14a to the rear at either lateral side of the cushion frame 12. As shown in FIGS. 3 and 4, each tip portion 14b of the link is connected to each side frame 13b of the back frame 13 in a freely rotatable manner by a pin 14d in a relatively lower position of the side frame.

As shown in FIG. 2, the lock mechanism 15 is attached to the cushion frame 12 relatively in a front side position (position at a fore side compared with the center) at either lateral side of the cushion frame 12. The lock mechanism 15 is latch-connected to a striker 22 fixed to a vehicle 20 side in a removable manner. The lock mechanisms 16 are attached to a lower end portion (each of right and left) side frames 13b of the back frame 13. The lock mechanism 16 is latch-connected to a striker 23 fixed to the vehicle 20 side in a removable manner.

The back frame 13 has a reinforced frame 13d as shown in FIG. 2. The reinforced frame 13d vertically extends over an under frame 13a and an upper frame 13c at an approximately central position in a lateral direction of the back frame 13. The upper frame 13c is attached with two pairs of holders 13e. Each pair of holders 13e are mounted with a head rest 4 in a vertically position-adjustable manner (refer to FIG. 1).

A pair of belt anchors 17 are mounted on the under frame 13a at an approximately central position of the under frame 13a as shown in FIG. 2. Each belt anchor 17 is fastened with an inner belt 18 of a seat belt. The inner belt 18 has a belt 18a to be fastened to the belt anchor 17, and a buckle 18b to be attached to a tip of the belt 18a. The buckle 18b is guided to a position on the seat cushion 2 through a gap between the seat back 3 and the seat cushion 2 to be fastened to an outer belt not shown. The outer belt, which is mounted in the vehicle 20 in a drawable manner from an upper side at either lateral side of the seat back 3, is drawn out and coupled with the inner belt 18 so as to restrain a passenger in a seated position on the seat cushion 2.

Arms 5 are provided at both lateral sides of the back frame 13 as shown in FIG. 2. Each arm 5 is fixed at one end 5a to an upper end of the side frame 13b of the back frame 13, and rotatably attached at the other end 5b to the ceiling 20a of the vehicle 20 (refer to FIG. 1). A dumper 6 is rotatably attached between one arm 5 and the vehicle 20. The dumper 6 biases the one arm 5, and thus biases the seat 1 to a ceiling 20a side.

Force transmission structures 7 are provided between the back frame 13 and the cushion frame 12 (refer to FIG. 2), which transmit force from a back frame 13 side to a cushion frame 12 side, the force being applied when the inner belt 18 is strongly pulled forward. Each force transmission structure 7 is configured by the link 14 and the lock mechanism 16.

The lock mechanism 16 has a base 16a and a hook 16b as shown in FIG. 3. The base 16a has a pair of plates on either side, each plate having a recess 16a1 insertable into striker 23. The hook 16b is mounted in the base 16a in a tiltable manner, and latched by the striker 23 fitted in the recess 16a1. The hook 16b may be tilted by a cable and a pole, which are not shown, so as to be released from a latched condition with the striker 23.

The lock mechanism 16 is even a member of the force transmission structure 7. That is, the lock mechanism 16 is attached to the side frame 13b at a lower side of the tip portion 14b of the link 14 as shown in FIG. 3. As shown in FIG. 4, the lock mechanism 16 is arranged to lap over the link 14 in a seat width direction (vehicle width direction), and to form a gap to the link 14 at a back side of the link 14. When the seat 1 is used between a use position and a storage position, the lock mechanism 16 does not hit the link 14. However, when the inner belt 18 is strongly pulled forward (in particular, upward and forward), the lock mechanism 16 pushes a rear end 14c of the link 14.

That is, as seen in FIG. 3, the inner belt 18 is strongly pulled forward, so that a component is deformed, for example, at least one of the belt anchor 17, back frame 13, lock mechanism 16, and striker 23 being elastically or plastically deformed. Thus, as shown in FIGS. 3 and 4, the lock mechanism 16 operates such that a front plate 16a2 of the base 16a hits the rear end 14c in an approximately center of the link 14. As a result, the lock mechanism 16 pushes the link 14 from the rear to the front, whereby force is transmitted from the back frame 13 side to the cushion frame 12 side.

Accordingly, the force transmission structure 7 is provided between the cushion frame 12 and the back frame 13 as shown in FIG. 3. Therefore, the force, by which the seat belt is pulled, is transmitted from the back frame 13 side to the cushion frame 12 side by the force transmission structure 7. Therefore, force (load) is dispersedly supported by a region at a seat cushion 2 side and a region at a seat back 3 side. Consequently, strength required for the back frame 13 is reduced, and thereby a frame structure can be simplified or reduced in weight.

The force transmission structure 7 is configured by the link 14 and the lock mechanism 16 as shown in FIGS. 2 and 3. In the structure, when the inner belt (seat belt) 18 is pulled forward, the lock mechanism 16 pushes the link 14 from the rear to the front. And the link 14 is used for connecting the cushion frame 12 with the back frame 13 in a freely rotatable manner. The lock mechanism 16 is used for latch-connecting the seat back 3 to the vehicle body 20. Thus, the vehicle seat 1 can be configured by a small number of components due to component sharing.

Figure 5:
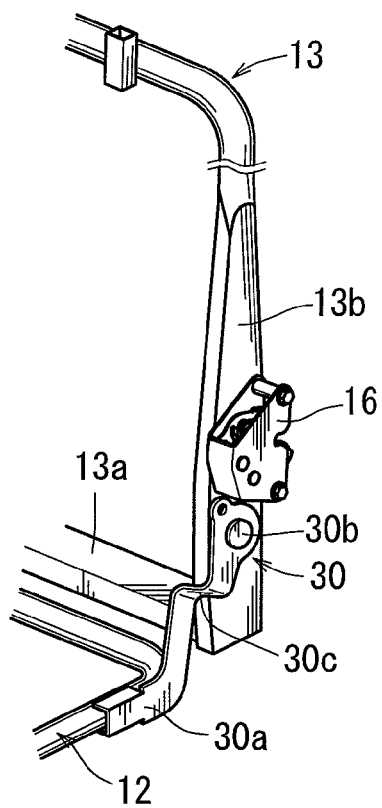
FIG. 5 is a perspective view of a part of a frame structure of a vehicle seat of another configuration adjacent to a force transmission structure.
Figure 6:
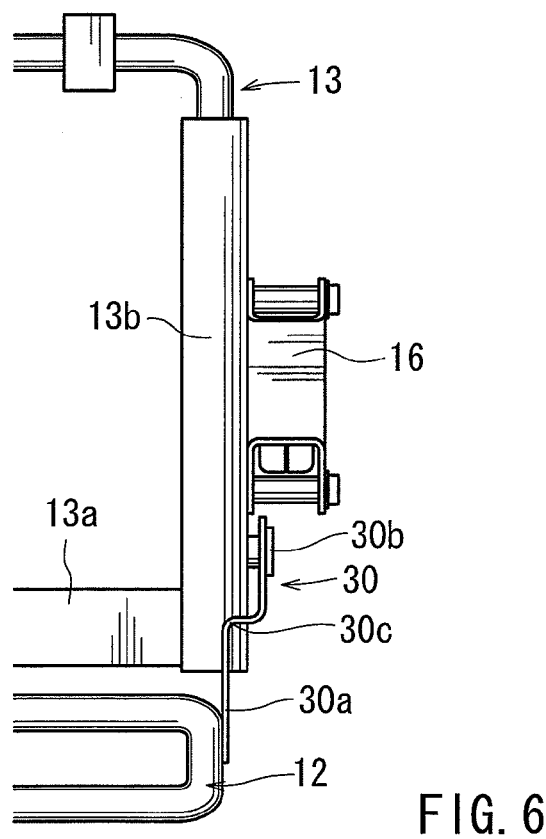
FIG. 6 is a front view of a part of the frame structure of FIG. 5.

Another configuration according to the present invention will be described in reference to FIGS. 5 and 6. This configuration is similar to the one shown in FIGS. 1 to 4. However, FIGS. 5 and 6 is different in position of a lock mechanism 16 and in force transmission structure from FIGS. 1 to 4. FIGS. 5 and 6 will be described below, the description focusing on differences from FIGS. 1 to 4.

As shown in FIG. 5, a lock mechanism 16 is attached to a side face of a side frame 13b of a back frame 13 at an upper side above link 30. A force transmission structure is configured by the side frame 13b and the link 30. The link 30 is fixed at one end 30a to a cushion frame 12, and connected at a tip 30b to a side face of the side frame 13b in a freely rotatable manner. As shown in FIGS. 5 and 6, the link 30 has a turning portion 30c that turns to a front side of the side frame 13b.

As shown in FIG. 5, the turning portion 30c laps over the side frame 13b in a seat width direction (vehicle width direction), and is arranged with a slight gap in relation to the side frame 13b. The turning portion 30c does not contact to the side frame 13b in a normal use condition of the seat 1. However, as seen in FIG. 3, the inner belt 18 is strongly pulled forward, so that a component is deformed, for example, at least one of the belt anchor 17, back frame 13, lock mechanism 16, and striker 23 is elastically or plastically deformed, resulting in the side frame 13b contacting the turning portion 30c. As a result, the link 30 is pushed from the rear to the front by the side frame 13b, so that force is transmitted from a seat back 3 side to a seat cushion 2 side.

Accordingly, the force transmission structure has the link 30. The link 30 has the turning portion 30c, and is structured such that when the seat belt is pulled forward, the turning portion 30c is pushed from the rear to the front by the back frame 13. And the link 30 is used for connecting the cushion frame 12 with the back frame 13 in a freely rotatable manner. The lock mechanism 16 is used for latch-connecting the seat back 3 to the vehicle body 20. Thus, the vehicle seat 1 can be configured by a small number of components due to component sharing.

Figure 7:
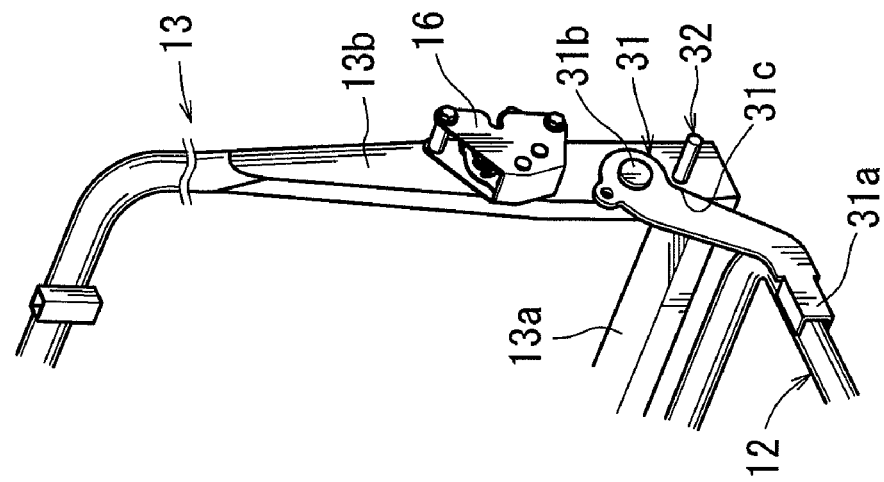
FIG. 7 is a perspective view of a part of a frame structure of a vehicle seat of the another configuration adjacent to a force transmission structure.

Another configuration according to the present invention will be described in reference to FIG. 7. This configuration is similar to the one shown in FIGS. 1 to 4. However, FIG. 7 is different in position of a lock mechanism 16 and in the force transmission structure from FIGS. 1 to 4. FIG. 7 will be described below, the description focusing on differences from FIGS. 1 to 4.

As shown in FIG. 7, the lock mechanism 16 is attached to a side face of a side frame 13b of a back frame 13 at an upper side above link 31. A force transmission structure is configured by the link 31 and a force application part 32. The link 31 is fixed at one end 31a to a cushion frame 12, and rotatably connected at a tip 31b to a side face of the side frame 13b. The force application part 32 laterally projects from the side face of the side frame 13b, and is provided in a position behind the link 31 in a manner of lapping over the link 31 in a seat width direction (vehicle width direction).

The force application part 32 is arranged with a slight gap in relation to the link 31. The force application part 32 does not contact to the link 31 in a normal use condition of the seat 1. However, as seen in FIG. 3, the inner belt 18 is strongly pulled forward, so that a component is deformed, for example, at least one of the belt anchor 17, back frame 13, lock mechanism 16, and striker 23 is deformed, thereby the force application part 32 contacts a rear edge 31c in an approximately central position of the link 31. As a result, the link 31 is pushed from the rear to the front by the force application part 32, so that force is transmitted from a seat back 3 side to a seat cushion 2 side.

Accordingly, the force transmission structure has the link 31 and the force application part 32. When the seat belt is pulled forward, the force application part 32 pushes the link 31 from the rear to the front. Therefore, the force transmission structure can be configured by a simple structure that the force application part 32 is provided on the back frame 13.

Figure 9:
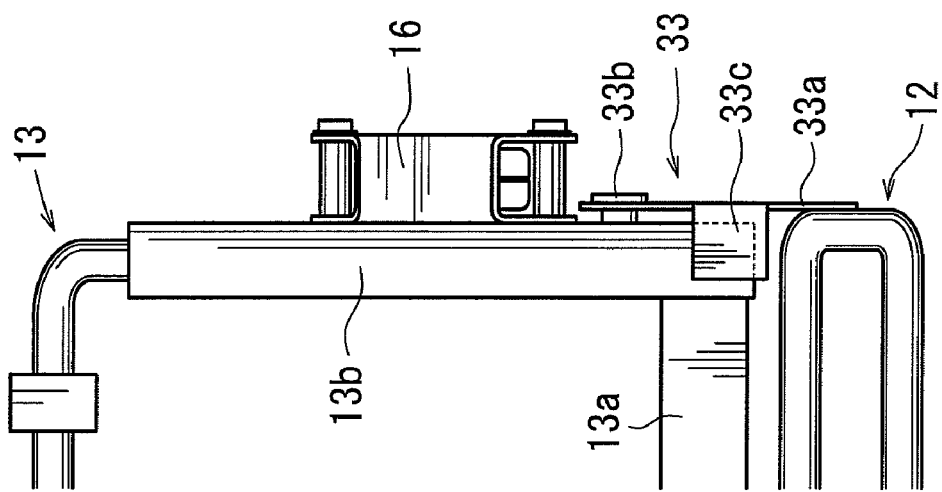
FIG. 9 is a front view of a part of the frame structure of FIG. 8.
Figure 8:
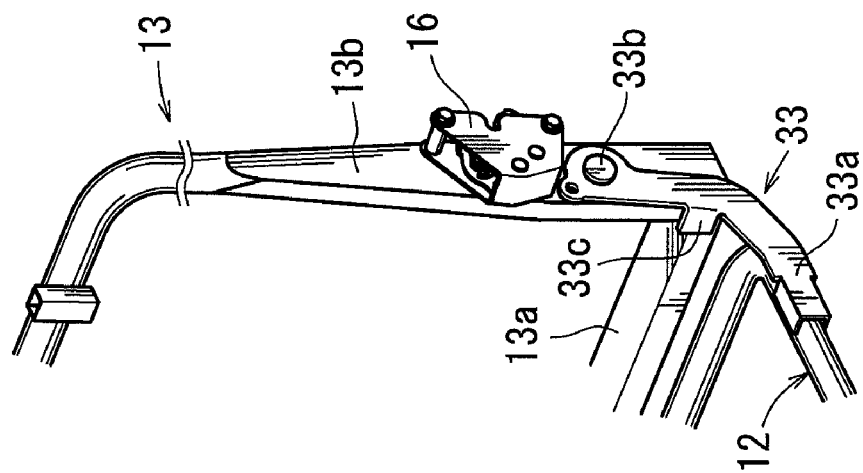
FIG. 8 is a perspective view of a part of a frame structure of a vehicle seat of the another configuration adjacent to a force transmission structure.

Another configuration according to the present invention will be described in reference to FIGS. 8 and 9. This configuration is similar to the one shown in FIGS. 1 to 4. However, FIGS. 8 and 9 are different in position of a lock mechanism 16 and in force transmission structure from FIGS. 1 to 4. FIGS. 8 and 9 will be described below, the description focusing on differences from FIGS. 1 to 4.

As shown in FIGS. 8 and 9, a lock mechanism 16 is attached to a side face of a side frame 13b of a back frame 13 at an upper side above link 33. A force transmission structure is configured by the side frame 13b and a force experience part 33c formed in the link 33. The link 33 is fixed at one end 33a to a cushion frame 12, and connected at a tip 33b to a side face of the side frame 13b in a freely rotatable manner. The link 33 has the force experience part 33c on an upper edge in an approximately central position of the link.

The force experience part 33c overhangs a front side of the side frame 13b from the link 33, and forms a slight gap in relation to the side frame 13b. The force experience part 33c does not contact to the side frame 13b in a normal use condition of the seat 1. However, as seen in FIG. 3, the inner belt 18 is strongly pulled forward, so that a component is deformed, for example, at least one of the belt anchor 17, back frame 13, lock mechanism 16, and striker 23 is deformed, thereby the side frame 13b contacts the force experience part 33c. As a result, the link 33 is pushed from the rear to the front by the side frame 13b, so that force is transmitted from a seat back 3 side to a seat cushion 2 side.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

(1) In FIG. 3, the belt anchor 17 is provided at the back frame 13 side, and force from the seat belt is transmitted from the back frame side to the cushion frame side by the transmission structure. However, a structure may be used, in which the belt anchor is provided at a cushion frame side, and the force is transmitted from the cushion frame side to the back frame side by a transmission structure.

(2) In FIGS. 3 to 9, the each force transmission structure is a structure where force is transmitted from the back frame 13 side to the cushion frame 12 side via the link 14, 30, 31 or 33. However, in place of the structure, a configuration is also acceptable, in which a member that transmits force from the back frame 13 side to the cushion frame 12 side is provided on one of the frames 12 and 13.

(3) In FIG. 1, the seat 1 is an in-ceiling storage seat with the arm 5. However, a configuration is also acceptable, in which a vehicle seat does not have the arm 5, and is foldable and mounted in the vehicle body 20 in a removable manner.

(4) In FIGS. 3 to 9, the each link 14, 30, 31 or 33 is a separate member from the cushion frame 12. However, a configuration is also acceptable, in which a link is integrally formed on a cushion frame.

This invention claims:

1. A vehicle seat comprising:
a cushion frame;
a back frame that is rotatably connected to the cushion frame;
a first lock mechanism positioned on the back frame and latch-connected to a first striker;
a second lock mechanism positioned on the cushion frame and latch-connected to a second striker; and
a belt anchor positioned on at least one of the cushion and back frames and fastened with a seat belt, wherein:
a force transmission structure is provided between the cushion and back frames, in which when the seat belt is pulled forward, so that a member between the belt anchor and at least one of the first striker and the second striker is deformed, a member at a side of the at least one of the cushion and back frames pushes a member at a side of the other frame, thereby force is transmitted from the at least one of the cushion and back frame side to the other frame side, and
the force transmission structure is a structure having a link as the member at a side of the cushion frame, the link extends from the cushion frame and is rotatably connected at a tip portion of the link to the back frame.

2. A vehicle seat comprising:
a cushion frame;
a back frame that is rotatably connected to the cushion frame;
a first lock mechanism positioned on the back frame and latch-connected to a first striker;

a second lock mechanism positioned on the cushion frame and latch-connected to a second striker; and a belt anchor positioned on at least one of the cushion and back frames and fastened with a seat belt, wherein:

a force transmission structure is provided between the cushion and back frames, in which when the seat belt is pulled forward, so that a member between the belt anchor and at least one of the first striker and the second striker is deformed, a member at a side of the at least one of the cushion and back frames pushes a member at a side of the other frame, thereby force is transmitted from the at least one of the cushion and back frame side to the other frame side, and the force transmission structure is in a structure having a link and the first lock mechanism, the link extends from the cushion frame and is rotatably connected at a tip portion of the link to the back frame, and the first lock mechanism is attached to the back frame at a rearward position in relation to the link, and when the seat belt is pulled forward, the first lock mechanism pushes the link from a rear side of the link.

3. A vehicle seat comprising:

a cushion frame;

a back frame that is rotatably connected to the cushion frame;

a first lock mechanism positioned on the back frame and latch-connected to a first striker;

a second lock mechanism positioned on the cushion frame and latch-connected to a second striker; and a belt anchor positioned on at least one of the cushion and back frames and fastened with a seat belt, wherein:

a force transmission structure is provided between the cushion and back frames, in which when the seat belt is pulled forward, so that a member between the belt anchor and at least one of the first striker and the second striker is deformed, a member at a side of the at least one of the cushion and back frames pushes a member at a side of the other frame, thereby force is transmitted from the at least one of the cushion and back frame side to the other frame side, and the force transmission structure has a link, the link extends from the cushion frame and is rotatably connected at a tip portion of the link to the back frame, and the link has a turning portion that turns to a front side of the back frame, and when the seat belt is pulled forward, the back frame pushes the turning portion from a rear side of the turning portion.

4. A vehicle seat comprising:

a cushion frame;

a back frame that is rotatably connected to the cushion frame;

a first lock mechanism positioned on the back frame and latch-connected to a first striker;

a second lock mechanism positioned on the cushion frame and latch-connected to a second striker; and a belt anchor positioned on at least one of the cushion and back frames and fastened with a seat belt, wherein:

a force transmission structure is provided between the cushion and back frames, in which when the seat belt is pulled forward, so that a member between the belt anchor and at least one of the first striker and the second striker is deformed, a member at a side of the at least one of the cushion and back frames pushes a member at a side of the other frame, thereby force is transmitted from the at least one of the cushion and back frame side to the other frame side, and the force transmission structure has a link and a force application part, the link extends from the cushion frame and is rotatably connected at a tip portion of the link to the back frame, the force application part is provided on the back frame at a rearward position in relation to the link, and when the seat belt is pulled forward, the force application part pushes the link from a rear side of the link.

* * * * *